(12) United States Patent
Ma et al.

(10) Patent No.: US 11,455,656 B2
(45) Date of Patent: Sep. 27, 2022

(54) METHODS AND APPARATUS FOR ELECTRONICALLY PROVIDING ITEM ADVERTISEMENT RECOMMENDATIONS

(71) Applicant: Walmart Apollo, LLC, Bentonville, AR (US)

(72) Inventors: Luyi Ma, Sunnyvale, CA (US); Hyun Duk Cho, San Francisco, CA (US); Sushant Kumar, Sunnyvale, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 105 days.

(21) Appl. No.: 16/686,577

(22) Filed: Nov. 18, 2019

(65) Prior Publication Data

US 2021/0150609 A1    May 20, 2021

(51) Int. Cl.
*G06Q 30/02*    (2012.01)
*G06Q 30/06*    (2012.01)

(52) U.S. Cl.
CPC ..... *G06Q 30/0255* (2013.01); *G06Q 30/0242* (2013.01); *G06Q 30/0251* (2013.01); *G06Q 30/0631* (2013.01)

(58) Field of Classification Search
None
See application file for complete search history.

(56) References Cited

U.S. PATENT DOCUMENTS

| 4,833,609 A | * | 5/1989 | Grulke, Jr. | G06Q 20/201 |
| | | | | 705/20 |
| 7,313,782 B2 | | 12/2007 | Lurie et al. | |

(Continued)

FOREIGN PATENT DOCUMENTS

| CN | 110415065 A | * | 11/2019 | ......... G06Q 30/0201 |
| WO | 2019151506 A1 | | 8/2019 | |

(Continued)

OTHER PUBLICATIONS

Machine translation of Chen, Chinese Patent Publication 110415065A, machine translation performed Apr. 3, 2021. (Year: 2021).*

(Continued)

*Primary Examiner* — Nicholas D Rosen
(74) *Attorney, Agent, or Firm* — Duane Morris LLP; Manita Rawat

(57) ABSTRACT

This application relates to apparatus and methods for automatically determining and providing item advertisements to customers. In some examples, a computing device obtains transaction data identifying in-store and/or online transactions. The computing device determines a distribution of purchased items over a plurality of item categories based on the transaction data. The computing device generates factorization matrices based on applying a machine learning process to the distribution, and generates relevancy scores for the plurality of item categories based on the factorization. The computing device may then select or generate item advertisements for items associated with the item categories based on the generated relevancy scores. The selected item advertisements may be displayed to a customer, for example, on a website.

19 Claims, 6 Drawing Sheets

(56) References Cited

U.S. PATENT DOCUMENTS

| | | | |
|---|---|---|---|
| 7,962,604 B1* | 6/2011 | Morris | G06Q 30/0244 709/224 |
| 8,443,384 B2 | 5/2013 | Larner et al. | |
| 8,615,524 B2 | 12/2013 | Kanigsberg | |
| 9,129,305 B2 | 9/2015 | Larner et al. | |
| 9,959,553 B2 | 5/2018 | Larner et al. | |
| 10,204,356 B2 | 2/2019 | Ferber et al. | |
| 10,248,712 B1 | 4/2019 | Cheng | |
| 10,430,825 B2 | 10/2019 | Chaudhuri et al. | |
| 10,452,978 B2* | 10/2019 | Shazeer | G06N 3/04 |
| 10,546,326 B2* | 1/2020 | Publicover | H04N 21/25883 |
| 10,552,866 B2* | 2/2020 | Muppirala | G06Q 30/0258 |
| 10,796,303 B2* | 10/2020 | Dutta | G06Q 30/0261 |
| 10,796,321 B1* | 10/2020 | Balakrishnan | G06Q 30/0631 |
| 10,902,341 B1 | 1/2021 | Qureshi | |
| 2002/0077901 A1* | 6/2002 | Katz | G06Q 30/0255 705/14.42 |
| 2006/0036510 A1* | 2/2006 | Westphal | G06Q 30/0631 705/26.62 |
| 2007/0250855 A1 | 10/2007 | Quinn-Jacobs et al. | |
| 2008/0250450 A1 | 10/2008 | Larner et al. | |
| 2010/0063644 A1 | 3/2010 | Kansal et al. | |
| 2011/0246285 A1 | 10/2011 | Ratnaparkhi et al. | |
| 2013/0031350 A1* | 1/2013 | Thielen | H04L 63/08 713/100 |
| 2013/0226995 A1* | 8/2013 | Etheredge | F15B 13/044 709/203 |
| 2013/0290064 A1* | 10/2013 | Altamirano | G06Q 10/06316 705/7.26 |
| 2013/0326354 A1* | 12/2013 | Anderson | G06Q 30/0241 715/733 |
| 2014/0012673 A1 | 1/2014 | Larner et al. | |
| 2014/0114757 A1* | 4/2014 | Frankel | G06Q 30/02 705/14.53 |
| 2014/0136127 A1* | 5/2014 | Sanchez Galicia | G01F 23/284 702/55 |
| 2014/0207680 A1* | 7/2014 | Rephlo | G06Q 20/3226 705/44 |
| 2015/0112807 A1* | 4/2015 | Muppirala | G06Q 30/0251 705/14.56 |
| 2015/0149321 A1* | 5/2015 | Salameh | G06Q 30/0613 705/26.41 |
| 2015/0262249 A1 | 9/2015 | Wical | |
| 2015/0294334 A1 | 10/2015 | Ming et al. | |
| 2015/0339722 A1 | 11/2015 | Hensgen et al. | |
| 2015/0348119 A1* | 12/2015 | Ferber | H04L 67/22 705/14.45 |
| 2016/0019271 A1 | 1/2016 | Ma et al. | |
| 2016/0132935 A1* | 5/2016 | Shen | G06Q 30/0269 705/14.66 |
| 2016/0180442 A1* | 6/2016 | Bar | G06Q 30/0631 705/26.7 |
| 2016/0253710 A1* | 9/2016 | Publicover | H04N 21/4532 705/14.66 |
| 2016/0300202 A1 | 10/2016 | Xu et al. | |
| 2016/0330232 A1* | 11/2016 | Kumar | H04L 63/1441 |
| 2016/0379251 A1 | 12/2016 | Sanjay et al. | |
| 2017/0004557 A1* | 1/2017 | Glasgow | G06Q 30/0631 |
| 2017/0018018 A1* | 1/2017 | Akpala | G06F 3/0488 |
| 2017/0024663 A1 | 1/2017 | Liu | |
| 2017/0140440 A1 | 5/2017 | Sripadham et al. | |
| 2017/0220945 A1 | 8/2017 | Barger et al. | |
| 2017/0236182 A1* | 8/2017 | Ignatyev | G06Q 30/0631 705/26.7 |
| 2017/0249564 A1 | 8/2017 | Garvey et al. | |
| 2017/0318350 A1* | 11/2017 | Wielgosz | H04N 21/4755 |
| 2018/0075502 A1* | 3/2018 | Dika | G06Q 20/00 |
| 2018/0276776 A1* | 9/2018 | Morrow | G06F 16/951 |
| 2018/0302291 A1 | 10/2018 | Srinivasan et al. | |
| 2018/0341656 A1 | 11/2018 | Kwok et al. | |
| 2018/0341860 A1* | 11/2018 | Shazeer | G06N 3/0454 |
| 2018/0349797 A1 | 12/2018 | Garvey et al. | |
| 2019/0073669 A1* | 3/2019 | Dutta | G06Q 20/4016 |
| 2019/0175133 A1* | 6/2019 | Lin | A61B 6/583 |
| 2019/0373007 A1 | 12/2019 | Salunke et al. | |
| 2020/0021893 A1 | 1/2020 | Muller et al. | |
| 2020/0125471 A1 | 4/2020 | Garvey et al. | |
| 2020/0125988 A1 | 4/2020 | Garvey et al. | |
| 2020/0233774 A1 | 7/2020 | Toledano | |
| 2020/0349271 A1 | 11/2020 | Binkley et al. | |
| 2020/0365143 A1 | 11/2020 | Ogawa et al. | |
| 2021/0150570 A1* | 5/2021 | Ma | G06Q 30/0254 |

FOREIGN PATENT DOCUMENTS

| | | |
|---|---|---|
| WO | 2020/142837 A1 | 7/2020 |
| WO | 2020142837 A1 | 7/2020 |

OTHER PUBLICATIONS

Yang, "An Improved Recommendation Algorithm for Micro-blog Network Advertisement," 2018 17th International Symposium on Distributed Computing and Applications for Business Engineering and Science, pp. 284-287; 2018. (Year: 2018).*

Lee et al., "Learning the Parts of Objects by Non-Negative Matrix Factorization[J]", Nature, 1999, 401(6755):788.

Quadrana, et al., "Sequence-Aware Recommender Systems" ACM Computing Surverys, vol. 1, Article 1, Feb. 2018, 35 pages.

Yedder, et al., "Modeling Prediction in Recommender Systems Using Restricted Boltzmann Machine", 2017 IEEE International Conference on Systems, Man, and Cybernetics (SMC), Banff Center, Banff, Canada, Oct. 5-8, 2017, 2063-2068.

* cited by examiner

METHODS AND APPARATUS FOR ELECTRONICALLY PROVIDING ITEM ADVERTISEMENT RECOMMENDATIONS

TECHNICAL FIELD

The disclosure relates generally to digital advertisements and, more specifically, to electronically determining and providing item advertisement recommendations.

BACKGROUND

At least some websites, such as retailer websites, display item advertisements. For example, a website may display item advertisements, and may further allow a customer to purchase advertised items. The displayed advertisements may be determined by advertisement recommendation systems, which may attempt to provide advertisements for items which the customer may be interested in. In some examples, however, the advertisement recommendation systems may provide advertisements for items that the customer finds irrelevant or is not interested in. For example, although a customer may be interested in viewing advertisements for and purchasing dog food, the advertisement recommendation system may nonetheless provide baby toy advertisements. In some examples, the customer may even be embarrassed by a displayed advertisement.

As a result, a retailer may lose sales of items to a customer. For example, the customer may not buy the advertised item. In addition, the customer may leave the website without having purchased an item that, if shown an advertisement for, the customer would have purchased. In some examples, if a customer perceives an advertisement as irrelevant or embarrassing, the customer may go elsewhere, such as another website, to make purchases. As such, there are opportunities to address advertisement recommendation systems.

SUMMARY

The embodiments described herein are directed to automatically determining and providing digital item advertisements that may be displayed, for example, on a website. The embodiments may allow a person, such as a customer, to be presented with advertisements that may be more likely to interest the person. For example, the embodiments may allow the person to view advertisements that the person may be more willing to purchase. In some examples, the embodiments may provide machine learning based processes that determine the items to advertise based on in-store and online transactions. In some examples, the item advertisements are displayed to persons viewing a website. In some examples, the item advertisements are personalized to each person. As a result, the embodiments may allow a retailer to present more relevant item advertisements to each person, thereby increasing the chances that the person will purchase the advertised items. In addition, because a person may now spend less time reviewing irrelevant advertisements, the person may have additional time to consider additional items for purchase. In addition to or instead of these example advantages, persons of ordinary skill in the art having the benefit of these disclosures would recognize and appreciate other advantages as well.

In accordance with various embodiments, exemplary systems may be implemented in any suitable hardware or hardware and software, such as in any suitable computing device. For example, in some embodiments, a computing device is configured to obtain transaction data associated with at least one customer, and generate first data identifying purchases in a plurality of categories for the at least one customer based on the transaction data. In some examples, generating the first data comprises generating a category matrix for the at least one customer, where each entry of the category matrix identifies a distribution of purchases in a category of the plurality of categories. The computing device may also be configured to generate a plurality of relevancy scores for pairs of the plurality of categories based on the first data. The computing device may further be configured to generate second data identifying at least one of the plurality of categories based on the generated plurality of relevancy scores.

In some examples, the computing device is configured to receive a plurality of item advertisement recommendations, and select at least one of the plurality of item advertisement recommendations based on the second data. In some examples, the computing device is configured to transmit the second data to another computing device.

In some embodiments, a method is provided that includes obtaining transaction data associated with at least one customer, and generating first data identifying purchases in a plurality of categories for the at least one customer based on the transaction data. In some examples, generating the first data comprises generating a category matrix for the at least one customer, where each entry of the category matrix identifies a distribution of purchases in a category of the plurality of categories. The method may also include generating a plurality of relevancy scores for pairs of the plurality of categories based on the first data. The method may further include generating second data identifying at least one of the plurality of categories based on the generated plurality of relevancy scores.

In some examples, the method includes receiving a plurality of item advertisement recommendations, and selecting at least one of the plurality of item advertisement recommendations based on the second data. In some examples, the method includes transmitting the second data to another computing device.

In yet other embodiments, a non-transitory computer readable medium has instructions stored thereon, where the instructions, when executed by at least one processor, cause a computing device to perform operations that include obtaining transaction data associated with at least one customer, and generating first data identifying purchases in a plurality of categories for the at least one customer based on the transaction data. In some examples, generating the first data comprises generating a category matrix for the at least one customer, where each entry of the category matrix identifies a distribution of purchases in a category of the plurality of categories. The operations may also include generating a plurality of relevancy scores for pairs of the plurality of categories based on the first data. The operations may further include generating second data identifying at least one of the plurality of categories based on the generated plurality of relevancy scores.

In some examples, the operations include receiving a plurality of item advertisement recommendations, and selecting at least one of the plurality of item advertisement recommendations based on the second data. In some examples, the operations include transmitting the second data to another computing device.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
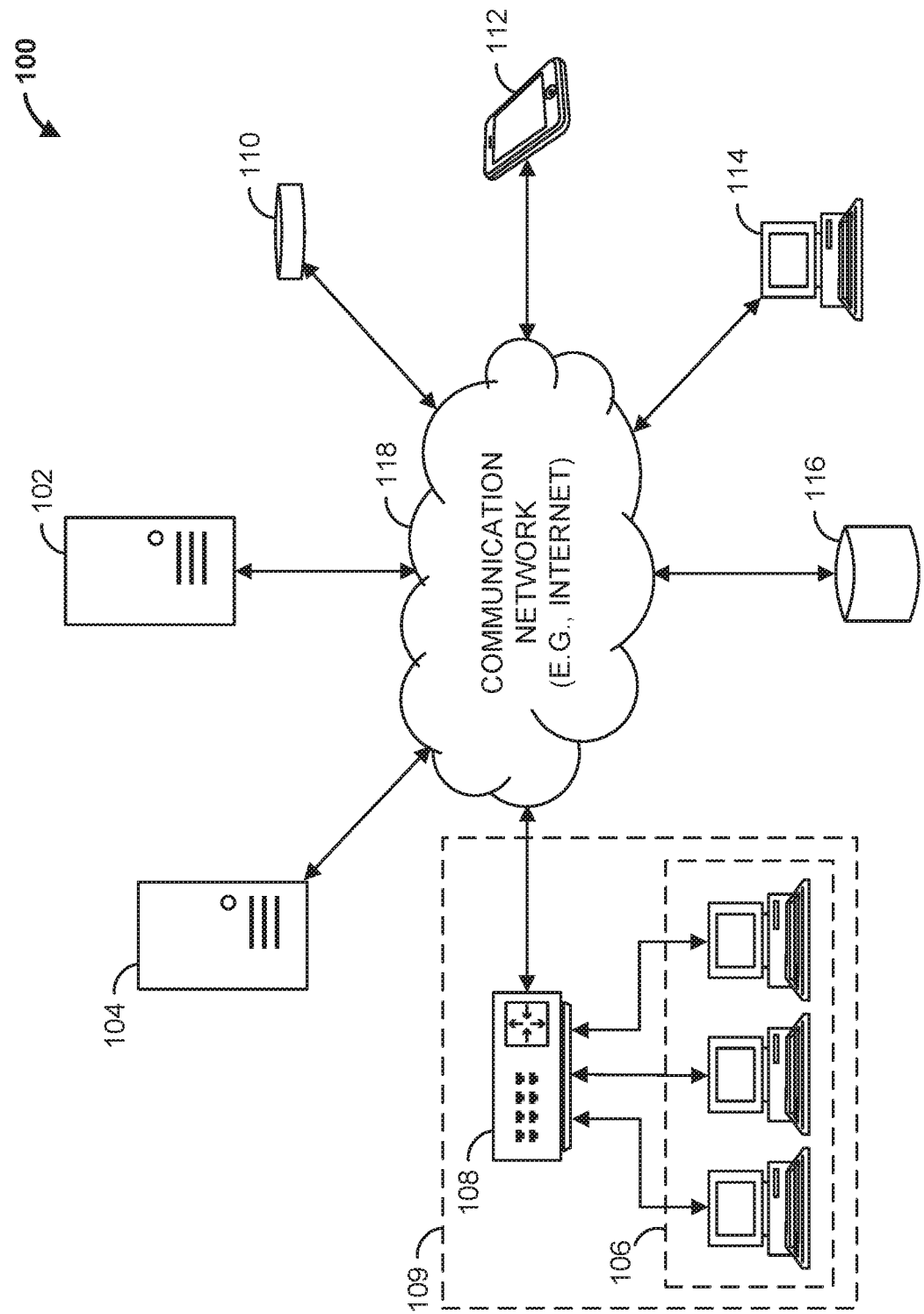
FIG. 1 is a block diagram of a digital advertisement customization system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a digital advertisement customization system 100 that includes an advertisement customization computing device 102 (e.g., a server, such as an application server), a web server 104, workstation(s) 106, database 116, and multiple customer computing devices 110, 112, 114 operatively coupled over network 118. Advertisement customization computing device 102, workstation(s) 106, server 104, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, advertisement customization computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, advertisement customization computing device 102 is operated by a retailer, and multiple customer computing devices 112, 114 are operated by customers of the retailer.

Although FIG. 1 illustrates three customer computing devices 110, 112, 114, digital advertisement customization system 100 can include any number of customer computing devices 110, 112, 114. Similarly, digital advertisement customization system 100 can include any number of workstation(s) 106, advertisement customization computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with advertisement customization computing device 102 over communication network 118. The workstation(s) 106 may send data to, and receive data from, advertisement customization computing device 102. For example, the workstation(s) 106 may transmit data related to an order purchased by a customer at store 109 to advertisement customization computing device 102. In response, advertisement customization computing device 102 may transmit an indication of one or more item advertisements to provide to the purchasing customer. For example, the item advertisements may be displayed on a receipt handed to the customer for the purchase order.

In some examples, web server 104 may host one or more web pages, such as a retailer's website. Web server 104 may transmit data related to an order purchased on the website by a customer to advertisement customization computing device 102. In response, advertisement customization computing device 102 may transmit an indication of one or more item advertisements to display on the website to the purchasing customer. For example, the item advertisements may be displayed on a checkout webpage, on a homepage, or on a webpage dedicated to a category of the advertised item when the customer is browsing that webpage.

First customer computing device 110, second customer computing device 112, and $N^{th}$ customer computing device 114 may communicate with web server 104 over communication network 118. For example, each of multiple computing devices 110, 112, 114 may be operable to view, access, and interact with webpages of a website hosted by web server 104. In some examples, web server 104 hosts a website for a retailer that allows for the purchase of items. For example, the website may list prices for advertised items. An operator of one of multiple computing devices 110, 112, 114 may access the website hosted by web server 104, add one or more items to an online shopping cart of the website, and perform an online checkout of the shopping cart to purchase the items for the listed prices.

Advertisement customization computing device 102 is operable to communicate with database 116 over communication network 118. For example, advertisement customization computing device 102 can store data to, and read data from, database 116. Database 116 can be a remote storage device, such as a cloud-based server, a memory device on another application server, a networked computer, or any other suitable remote storage. Although shown remote to advertisement customization computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Advertisement customization computing device 102 can generate, for each of a plurality of customers, advertisements that a customer may be interested in. For example, advertisement customization computing device 102 may identify one or more categories of items that have been purchased by customers. For example, cat food items and dog food items may below to a category of "pets." In some examples, an item may below to a plurality of levels of categories. For example, the cat food items and dog food items may belong to the category of "pets," as well as a subcategory of "pet foods" (e.g., pets->pet foods->dog food; pets->pet foods->cat food). Category pets may include further sub categories, such as "birds," "fish," "dog supplies," "dog treats," etc. Based on the identified categories (or sub-categories) of items, advertisement customization computing device 102 can determine one or more advertisements for items that are associated with (e.g., that fall within) the identified categories. In some examples, the advertisements are determined for a particular customer.

To identify the item categories, in some examples, advertisement customization computing device 102 obtains in-store purchase data for one or more customers. The in-store purchase data may identify previous purchases the one or more customers have made in a store, such as store 109. Advertisement customization computing device 102 may also obtain online purchase data for one or more customers. The online purchase data may identify previous purchases the one or more customers have made online, such as from a website hosted by web server 104. Advertisement customization computing device 102 may further obtain online session data for the one or more customers, such as from web server 104. The online session data may identify data associated with an online session, such as an online session the one or more customers have engaged in when viewing the website. For example, online session data may identify one or more of: advertisements a customer has viewed; advertisements a customer has clicked on; items that a customer added to an online shopping cart; items that a customer has clicked on; and search queries for a customer, for example.

Advertisement customization computing device 102 can then execute one or more machine learning processes (e.g., algorithms) that operate on the in-store purchase data, online purchase data, and/or online session data to determine one or more categories of items that a customer may be interested in (e.g., to purchase). In some examples, advertisement customization computing device 102 generates category masks that identify the one or more categories. Advertisement customization computing device 102 may then identify one or more advertisements based on the identified categories, and provide the advertisements for display to web server 104.

In some examples, the machine learning processes include applying one or more weights to in-store purchase data, online purchase data, and/or online session data. For example, advertisement customization computing device 102 may weight a particular online session, or an item that a particular customer may purchase, relatively more heavily, to generate the category masks.

In some examples, advertisement customization computing device 102 applies the category masks to recommended advertisements, such as those provided from a recommendation system (e.g., from a third party), to determine advertisements for the customer. For example, advertisement customization computing device 102 may receive recommended advertisements for a customer browsing a website hosted by web server 104. Advertisement customization computing device 102 may select one or more of the recommended advertisements based on the category mask. In some examples, advertisement customization computing device 102 compares the category mask to data (e.g., metadata) associated with each recommended advertisement. If a category for a recommended advertisement matches a category identified by the category mask, the recommended advertisement is allowed (e.g., is displayed on the website hosted by web server 104). Otherwise, if the categories do not match, the recommended advertisement is not allowed (e.g., is not displayed on the website hosted by web server 104).

In some examples, advertisement customization computing device 102 evaluates the effectiveness of the advertisements. For example, advertisement customization computing device 102 may determine whether a customer has added an advertised item to an online shopping cart. In some examples, advertisement customization computing device 102 determines whether one of a threshold number (e.g., three) of next items that are added to the online shopping cart include the advertised item. In some examples, advertisement customization computing device 102 determines whether the customer purchased the advertised item over a period of time, such as over the next month.

In some examples, advertisement customization computing device 102 trains the machine learning processes. The machine learning processes may be trained with historical in-store purchase data, historical online purchase data, and/or historical online session data. In some examples, the machine learning process is trained with historical online purchase data that identifies, for example, an order that items were added to cart. The machine learning processes learn which item categories go well together, and which do not, for example. With training, advertisement customization computing device 102 identifies an optimal set of parameters and, more specifically, values for the optimal set of parameters that are employed by the machine learning process.

Non-Negative Matrix Factorization for Complementary Category Masks

In some examples, in-store transactions are obtained to determine category masks. As noted above, the category masks are then applied to recommend advertisements, such as those from a third-party advertisement recommendation system, to identify advertisements for a particular customer.

In some examples, advertisement customization computing device 102 generates a category matrix for a customer that may be represented by $X^{|N| \times |M|}$. In this category matrix, each row is a customer's purchase distribution over various item categories. Each entry in the category matrix identifies a frequency of purchases (e.g., an amount, a percentage, a score, etc.) by the customer of a corresponding item category.

In some examples, the category matrix is factorized. For example, let $X^{|N| \times |M|}$ represent the category matrix to be factorized. Given a target value k, advertisement customization computing device 102 generates two low-rank matrices $W^{|N| \times |k|}$ and $H^{|k| \times |M|}$ to approximate the original category matrix X as close as possible such that any entry of W and H is non-negative (e.g., W≥0 and H≥0). For example, they may be non-negative constraints of a non-negative matrix factorization model, a type of unsupervised learning algorithm. An objective function may be executed to determine an optimal unsupervised learning algorithm. An example of an objective function to be minimized is given by the equation below:

$$W \geq 0, H \geq 0 \| X - WH \|_2^2 \qquad \text{(eq. 1)}$$

Complementary relationship benefits can be realized from the non-negative constraints on both W and H. Here, matrices W and H can be viewed as an encoding matrix of customers' preference over topics and topics distribution of categories, respectively. Each row of H is an M-dimension vector, storing weights of M categories, which can be viewed as a topic. Each row of W is a k-dimension vector, showing preference of topics. When performing reconstruction, the non-negative constraint can assure that the way of aggregation of encoded topics is addition, instead of subtraction. In other words, a transaction record could only be reconstructed by a subset of different categories (e.g., baby products, pets, grilling, etc.). This disentangles the co-appearance of categories which may be severe, for example, in area of grocery categories.

The relevancy between any pair of categories can be computed by the similarity of their weights over topics (i.e., the columns of matrix H). For example, $H_{cat_i}$ represents the column of matrix H for a category i.

For example, the cosine similarity between any pair of categories can be used to determine relevancy, as given by the equation below.

$$\text{relevancy} = \frac{H_{cat_i} \cdot H_{cat_j}}{\sqrt{\|H_{cat_i}\|^2} \sqrt{\|H_{cat_j}\|^2}} \qquad \text{(eq. 2)}$$

Advertisement customization computing device 102 can then compute category masks by setting a threshold for the relevancy. Advertisement customization computing device 102 keeps category pairs with relevancy scores above the threshold. For example, advertisement customization computing device 102 may compare the computed relevancies to the threshold. Only category masks with computed relevancies above the threshold are associated with a customer.

Category Matrix Data Smoothing

In some examples, trending items (e.g., "hot items") can introduce an unbalanced distribution of item purchase frequency. To alleviate issues cause by trending items, advertisement customization computing device 102 applies a smoothing algorithm to category matrix X.

To build the input matrix for factorization, as an example, a window of one month is selected as a time range for a transaction record. For example, assume advertisement customization computing device 102 generates a category matrix X based on historical transactions (e.g., purchases made previously by one or more customers, items added to an online cart by the one or more customers, etc.). To smooth any unbalanced distribution due to trending items, advertisement customization computing device 102 applies the following smoothing algorithm to each entry of category matrix X (e.g., to generate a transformed category matrix X):

$$tf - idf(cat_i) = \log(tf_{cat_i} + 1) \times \log\left( \frac{\max_{cat_j} \in \Omega(df_{cat_j})}{df_{cat_i}} + \frac{df_{cat_i}}{N_{doc}} \right) \qquad \text{(eq. 3)}$$

where:
$tf_{cat_i}$ is the term frequency of token $cat_i$ in a record;
$dfcat_i$ is the number of records containing $cat_i$; and
$\Omega$ is the set of categories.

In some examples, the transformed category matrix X may be normalized by rows. Advertisement customization computing device 102 may then generate category masks as described above based on the transformed category matrix X.

Evaluation Processing for Recommended Item Advertisements

To evaluate the unsupervised learning model's performance, advertisement customization computing device 102 may employ one or more series of metrics, such as to monitor the models' performance (e.g., effectiveness of recommended advertisements in relation to online activities, such as purchasing an item, clicking an item, or adding an item to an online shopping cart) on a real add-to-cart sequence in both recall-preferred ways (equation 4 and 5, below) and precision-preferred ways (equation 6 and 7, below).

$$NDCG@K = \frac{1}{N} \sum_{i=1}^{N} \frac{I(rank_i)}{\log_2(rank_i + 1)} \qquad \text{(eq. 4)}$$

$$HitRate@K = \frac{1}{N} \sum_{i=1}^{N} I(rank_i) \qquad \text{(eq. 5)}$$

$$mAP = \begin{cases} \frac{1}{\sum_{i=1}^{N} I(rank_i)} \sum_{i=1}^{N} \frac{I(rank_i)}{rank_i} & \sum_{i=1}^{N} I(rank_i) > 0 \\ 0 & \sum_{i=1}^{N} I(rank_i) = 0 \end{cases} \qquad \text{(eq. 6)}$$

$$QR = \begin{cases} \frac{1}{\sum_{i=1}^{N} I(rank_i)} \sum_{i=1}^{N} \frac{I(rank_i)(K+1-rank_i)}{K} & \sum_{i=1}^{N} I(rank_i) > 0 \\ 0 & \sum_{i=1}^{N} I(rank_i) = 0 \end{cases} \qquad \text{(eq. 7)}$$

$$I(rank_i) = \begin{cases} 1 & rank_i \leq K \\ 0 & rank_i > K \end{cases} \qquad \text{(eq. 8)}$$

where:
$rank_i$ is the model's rank for a next add-to-cart object in an actual add-to-cart sequence (e.g., as identified by online session data).

For example, advertisement customization computing device 102 may determine a performance value (e.g., as determined in accordance with one of the above equations) based on provided item recommendation advertisements and online session data for the customer.

In some examples, a weighted sum of four metrics may be computed, as illustrated in the equation below.

$$\text{score} = \alpha(\text{NDCG}@K + \text{HitRate}@K) + (1-\alpha)(mAP + QR) \quad \text{(eq. 9)}$$

In some examples, the coefficient α may be adjusted, for example, to balance recall and precision requirements. For example, a user may provide a configuration setting to advertisement customization computing device 102 to set a value for the coefficient α. For example, a user may specify that the coefficient α be set to 0.7.

Summary of Mask Generation and Implementation

By generating different versions of these machine learning models, advertisement customization computing device 102 can generate a series of category-to-category affinity matrices. The category-to-category affinity matrices may be used to identify item advertisements generally (e.g., to anyone viewing a particular webpage), or per customer, for example. These category-to-category affinity matrices may be evaluated via the four metrics noted above using, for example, actual add-to-cart data. In some examples, the category mask with the highest score is selected for each customer. The category mask is then used to select one or more item advertisements from among a plurality of advertisements to display to each customer.

A Recommender System with Item-Level Relatedness and Category Constraints

In some examples, advertisement customization computing device 102 combines an item-level model with the above described category-to-category masks to determine item advertisements for a particular customer. For example, the item-level model may be based on normalized point-wise mutual information such as defined by the equation below.

$$npmi(A, B) = \frac{\frac{\text{COUNT}[A, B] \cdot \text{TOTAL}}{\text{COUNT}[A] \cdot \text{COUNT}[B]}}{\log \frac{\text{COUNT}[A]}{\text{TOTAL}} \log \frac{\text{COUNT}[B]}{\text{TOTAL}}} \quad \text{(eq. 10)}$$

where:
TOTAL is the total number of purchases of items overall; and
COUNT[ ] is the number of purchases for an item (or, in some examples, a combination of items, such as a pair of items) for a particular customer.

Advertisement customization computing device 102 can compute the npmi for any pair of items based on a customer's transaction history, and store item pairs (e.g., in database 116) if their categories are included in the generated category mask. Advertisement customization computing device 102 may then allow advertisements for the customer only if the item is included in the stored item pairs for the customer.

Figure 2:
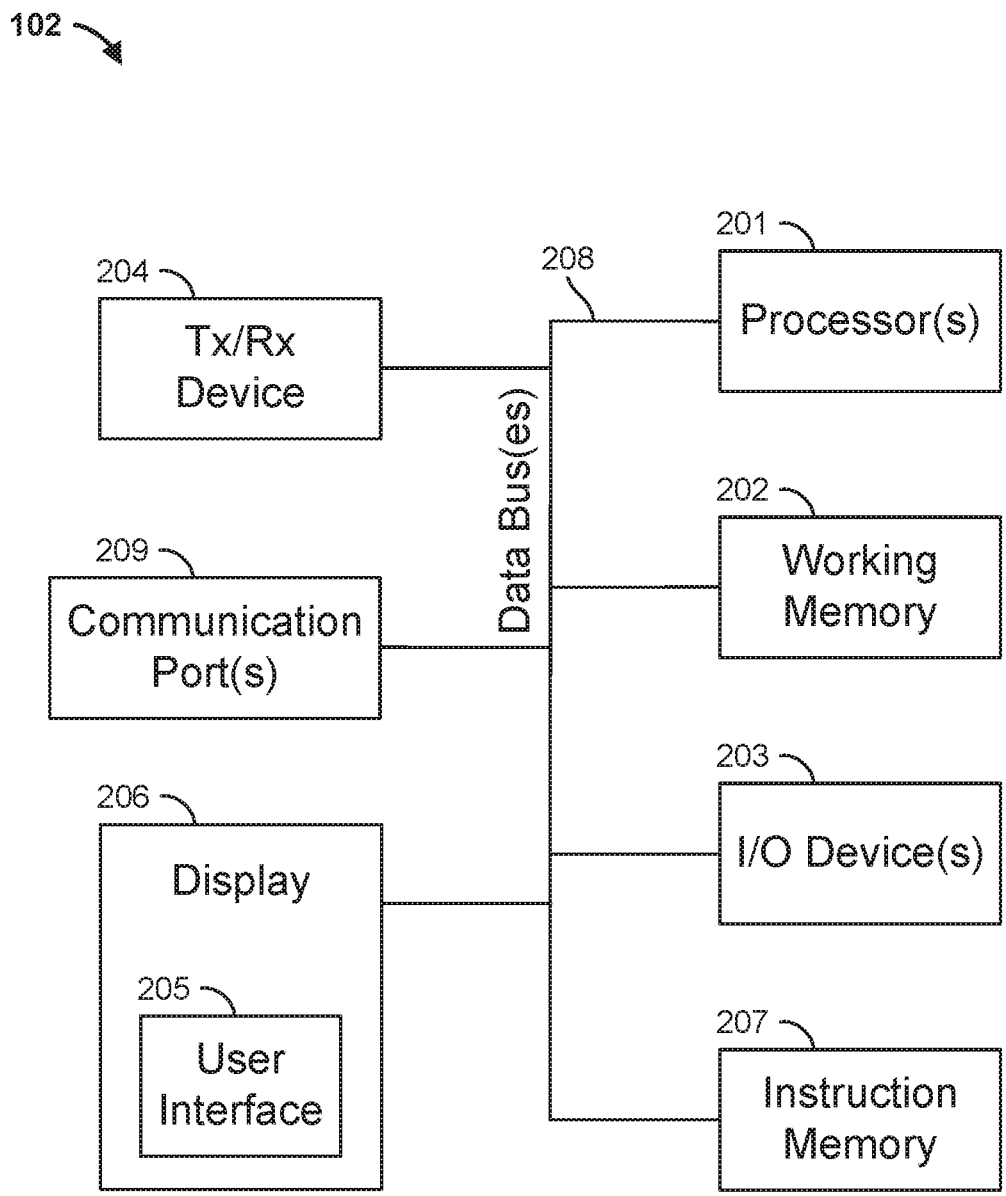
FIG. 2 is a block diagram of the advertisement customization computing device of the digital advertisement customization system of FIG. 1 in accordance with some embodiments.

FIG. 2 illustrates the advertisement customization computing device 102 of FIG. 1. Advertisement customization computing device 102 can include one or more processors 201, working memory 202, one or more input/output devices 203, instruction memory 207, a transceiver 204, one or more communication ports 209, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of advertisement customization computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as machine learning algorithm training data.

Display 206 can display user interface 205. User interfaces 205 can enable user interaction with advertisement customization computing device 102. For example, user interface 205 can be a user interface for an application of a retailer that allows a customer to view and interact with a retailer's webpage. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 advertisement customization computing device 102 will be operating in. Processor(s) 201 is operable to receive data from, or send data to, a network, such as communication network 118 of FIG. 1, via transceiver 204.

Figure 3:
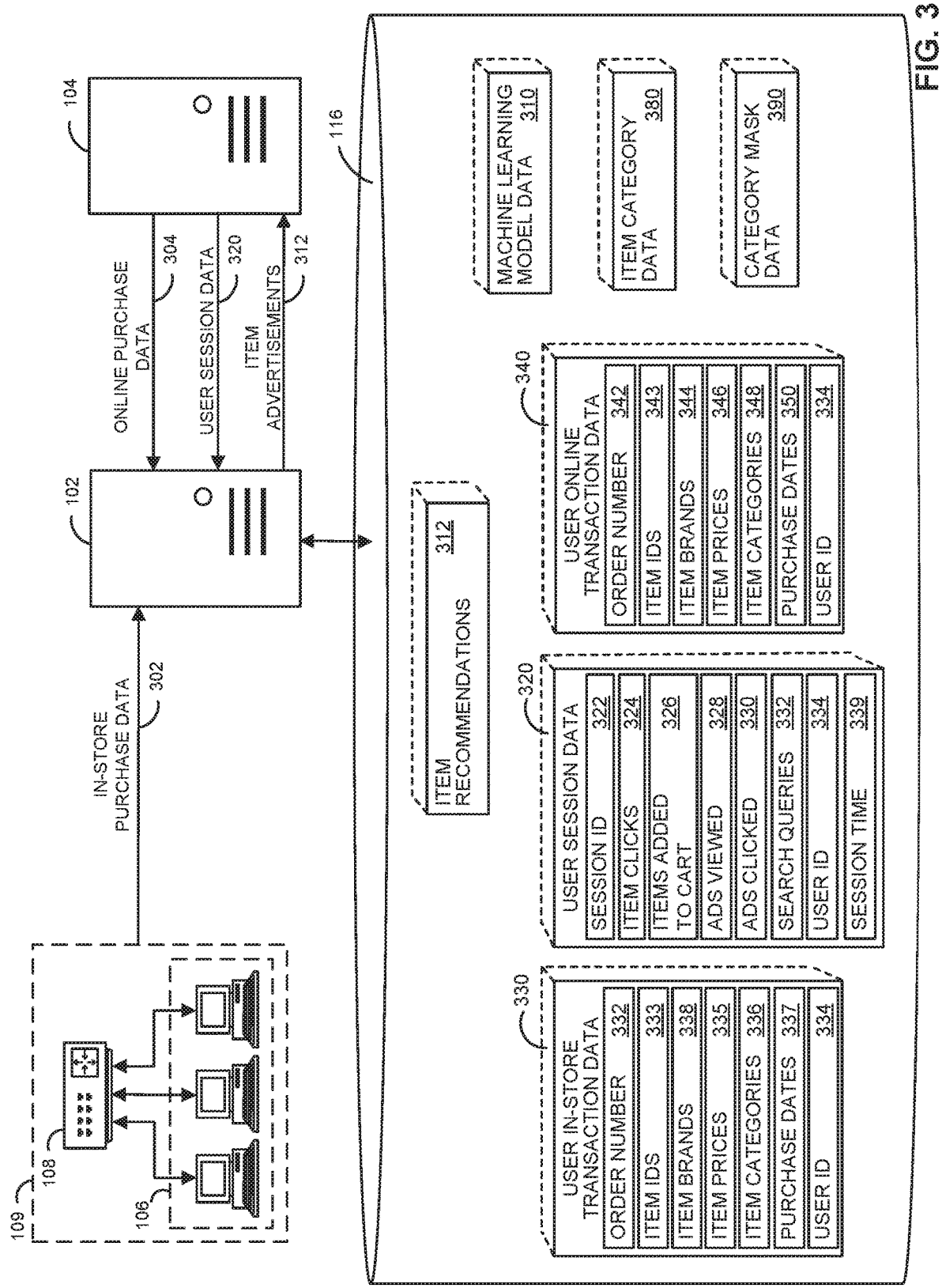
FIG. 3 is a block diagram illustrating examples of various portions of the digital advertisement customization system of FIG. 1 in accordance with some embodiments.

FIG. 3 is a block diagram illustrating examples of various portions of the digital advertisement customization system 100 of FIG. 1. As indicated in the figure, advertisement customization computing device 102 may receive in-store purchase data 302 from store 109. In-store purchase data 302 may identify and characterize items purchased by a customer at store 109. For example, in-store purchase data 302 may identify a history of items purchased in stores for each customer. Advertisement customization computing device 102 may parse in-store purchase data 302 to identify items in each purchase transaction, and may store the parsed data in database 116 as user in-store transactions data 330. For example, user in-store transactions data 330 may include an order number 332 identifying the purchase, item IDs 333 identifying one or more items purchased in the purchase, item brands 338 identifying a brand for each item purchased, item prices 335 identifying the price of each item purchased, item category 336 identifying a category of each item purchased, a purchase date 337 identifying the purchase date of the purchase order, and user ID 334 for the user making the corresponding purchase (e.g., a phone number, a login ID, a name, etc.).

Similarly, advertisement customization computing device 102 may receive online purchase data 304 from web server 104. Online purchase data 304 may identify and characterize items purchased by a customer on a website hosted by web server 104. For example, online purchase data 304 may identify a history of items purchased online by each customer. Advertisement customization computing device 102 may parse online purchase data 304 to identify items in each purchase transaction, and may store the parsed data in database 116 as user online transaction data 340. User online transaction data 340 may include an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 350 identifying the purchase date of the purchase order, and user ID 334 for the user making the corresponding purchase.

Advertisement customization computing device 102 may also receive user session data 320 from web server 104. User session data 320 identifies, for a user, data related to a browsing session, such as when the user is browsing a retailer's webpage hosted by web server 104. For example, user session data 320 may identify a history of user session each customer. In this example, user session data 320 may include a session ID 322, item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, search queries 332 identifying one or more searches conducted by the user during the browsing session, and user ID 334 ID (e.g., a customer ID, retailer website login ID, etc.). User session data 320 may also include session time 339, which may identify a purchase time stamp (e.g., when an item was purchased ruing the online session), a session start timestamp, a session stop timestamp, or any other time related data associated with the online session.

Based on one or more of user session data 320, user online transaction data 340, and user in-store transaction data 330, advertisement customization computing device 102 may generate category masks. The category masks may be used to determine item advertisements for one or more customers.

For example, machine learning model data 310, stored in database 116, may identify and characterize an unsupervised machine learning algorithm that, when executed, can identify item categories for a customer. For example, machine learning model data 310 may identify and characterized a machine learning model based on equation (1) above.

Advertisement customization computing device 102 can, based on one or more of user session data 320, user online transaction data 340, and user in-store transaction data 330, generate a category matrix, such as the category matrix X described above. Each category matrix may identify a plurality of categories, where each entry identifies a number of purchases by customers of items in a corresponding category. The categories may be identified, for example, by item category data 380. For example, item category data 380 may identify categories, and sub-categories, for each item that is sold either in-store (e.g., at store 109), or online (e.g., via a website hosted by web server 104). A user may add, remove, or rearrange categories in item category data 380 via, for example, advertisement customization computing device 102.

The generated user category matrix may be provided to the machine learning model to generate encoding matrices of customers (e.g., matrix W) and distribution of categories (e.g., matrix H). Advertisement customization computing device 102 may then generate relevancy scores based on the similarities of distribution over categories (e.g., matrix H) based on a matrix relevancy algorithm (e.g., in accordance with equation 2). Advertisement customization computing device 102 may compare the relevancy scores to a threshold, and generate the category masks based on category pairs with relevancy scores above the threshold. Advertisement customization computing device 102 may store the generated category masks, for each user, in database 116 as category mask data 390.

Based on category mask data 390, advertisement customization computing device 102 may provide item advertisements 312 to web server 104. Item advertisements 312 identify one or more item advertisements for a particular customer, such as one currently browsing a website hosted by web server 104.

Figure 4:
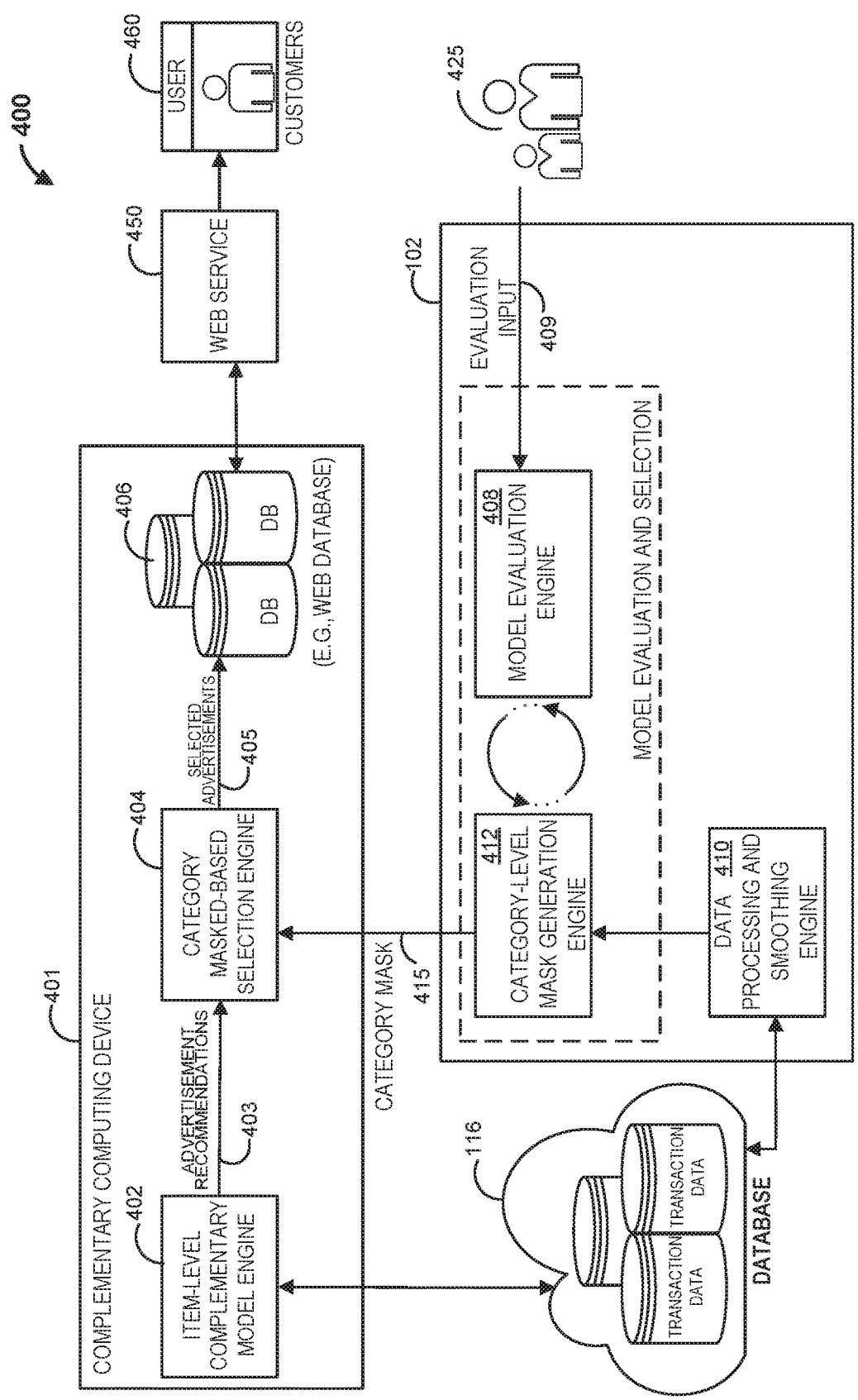
FIG. 4 of a block diagram of another digital advertisement customization system in accordance with some embodiments.

FIG. 4 illustrates a digital advertisement customization system 400 that includes a complementary item-model computing device 401 and advertisement customization computing device 102. Digital advertisement customization system 400 can generate personalized item advertisement recommendations for a particular user.

Complementary item-model computing device 401 may be a server, such as a cloud-based server, and includes an item-level complementary model engine 402 that generates advertisement recommendations 403 identifying and characterizing item advertisements. For example, item-level complementary model engine 402 may obtain transaction data from database 116, such as user online transaction data 340 and user in-store transaction data 330, and determine one or more item advertisements based on the obtained transaction data.

Complementary item-model computing device 401 also includes category mask-based selection engine 404, which selects which, if any, item advertisements identified by advertisement recommendations 403 are shown to a particular customer. Category mask-based selection engine 404 identifies the selected item advertisements based on category mask 415 provided by advertisement customization computing device 102. Once selected, category mask-based selection engine 404 provides the selected advertisements 405 to a web database 406. A web service 450, such as a website hosted by web server 104, may obtain the selected advertisements 405 from web database 406, and display the identified advertisements to a corresponding customer 460.

As illustrated in the figure, advertisement customization computing device 102 includes category mask generation engine 412, which generates category masks 415 based on a generated category matrix (e.g., category matrix X). The category matrix may identify transactions based on one or more of user session data 320, user online transaction data 340, and user in-store transaction data 330 stored in database 116.

In this example, advertisement customization computing device 102 further includes data processing and smoothing engine 410, which can apply a smoothing technique to the generated category matrix to smooth unbalanced distributions due to effects of, for example, trending items.

Advertisement customization computing device 102 also includes model evaluation engine 408, which allows for the evaluation of the machine learning model utilized to generate category mask 415. Model evaluation engine 408 may receive evaluation input 409 from, for example, from an operator 425. Evaluation input 409 may identify a selection of an evaluation algorithm, or may specify values for parameters of a selected evaluation algorithm, for example. In some examples, evaluation input 409 identifies evaluation goals, such as whether the operator desires to monitor the models' performance on a real add-to-cart sequence in recall-preferred ways or precision-preferred ways. Model evaluation engine 408 then selects the appropriate evaluation process (e.g., algorithm) based on the identified goals.

Figure 5:
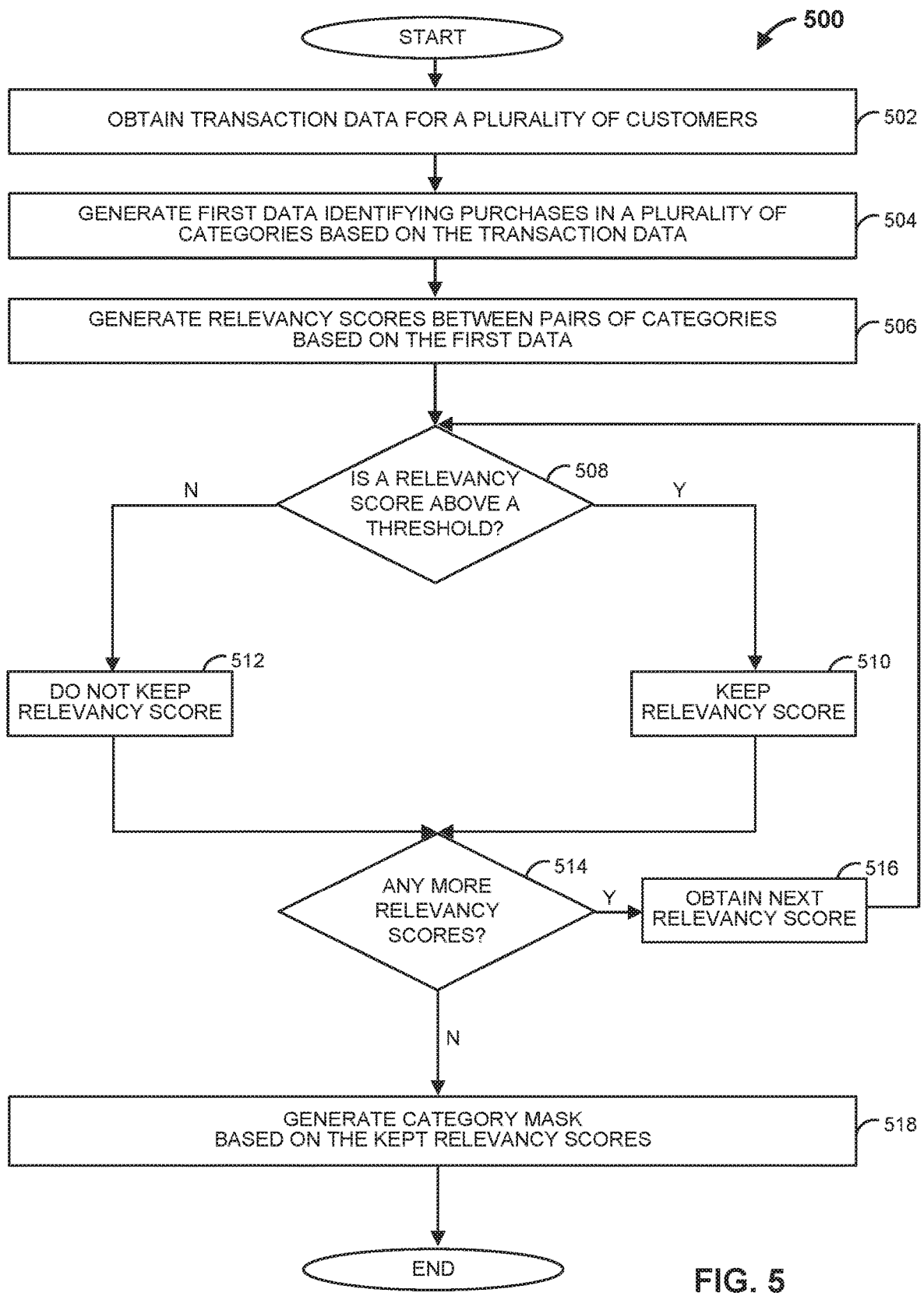
FIG. 5 is a flowchart of an example method that can be carried out by the digital advertisement customization system of FIG. 1 in accordance with some embodiments.

FIG. 5 is a flowchart of an example 500 that can be carried out by the digital advertisement customization system 100 of FIG. 1. Beginning at step 502, transaction data is obtained for a plurality of customers. For example, digital advertisement customization device 102 may obtain user in-store transaction data 330 and user online transaction data 340 from database 116 for the customer. At step 504, first data is generated based on the obtained transaction data. The first data identifies a frequency of item purchases in a plurality of categories. For example, digital advertisement customization device 102 may generate a category matrix (e.g., a category matrix X described above) for the customer based on the user in-store transaction data 330 and user online transaction data 340 obtained from database 116. At step 506, relevancy scores between pairs of categories are generated based on the first data. For example, digital advertisement customization device 102 may compute a relevancy score between pairs of categories based on the similarity of their distribution over topics (i.e., matrix H). The relevancy score may be based on computing a cosine similarity between each pair of categories, for example.

Proceeding to step 508, a determination is made as to whether a relevancy score is above a threshold. The threshold may have been preconfigured by an operator of digital advertisement customization device 102, for example. If the relevancy score is not above the threshold, the method proceeds to step 512, where the relevancy score is not kept (e.g., not stored). If the relevancy score is above the threshold, the method instead proceeds to step 510, where the relevancy score is kept (e.g., stored). For example, digital advertisement customization device 102 may compare the relevancy score to the threshold, and may store the relevancy score in database 116 if the relevancy score is above the threshold. The stored relevancy scores are associated with the customer. From either step 512 or step 510, the method proceeds to step 514.

At step 514, a determination is made as to whether there are any more relevancy scores. If there is at least one more relevancy score, the method proceeds to step 516, to obtain the next relevancy score (e.g., one that was generated at step 506. The method then proceeds back to step 508, to determine if the newly obtained relevancy score is above the threshold. If, at step 514, there are no additional relevancy scores, the method proceeds to step 518. At step 518, a category mask is generated based on the kept relevancy scores. For example, digital advertisement customization device 102 may generate a category mask that identifies the categories associated with relevancy scores above the threshold. The category mask may be utilized to determine item advertisements provided to one or more customers. For example, item advertisements for items associated with the identified categories may be displayed to customers viewing a website. The method then ends.

Figure 6:
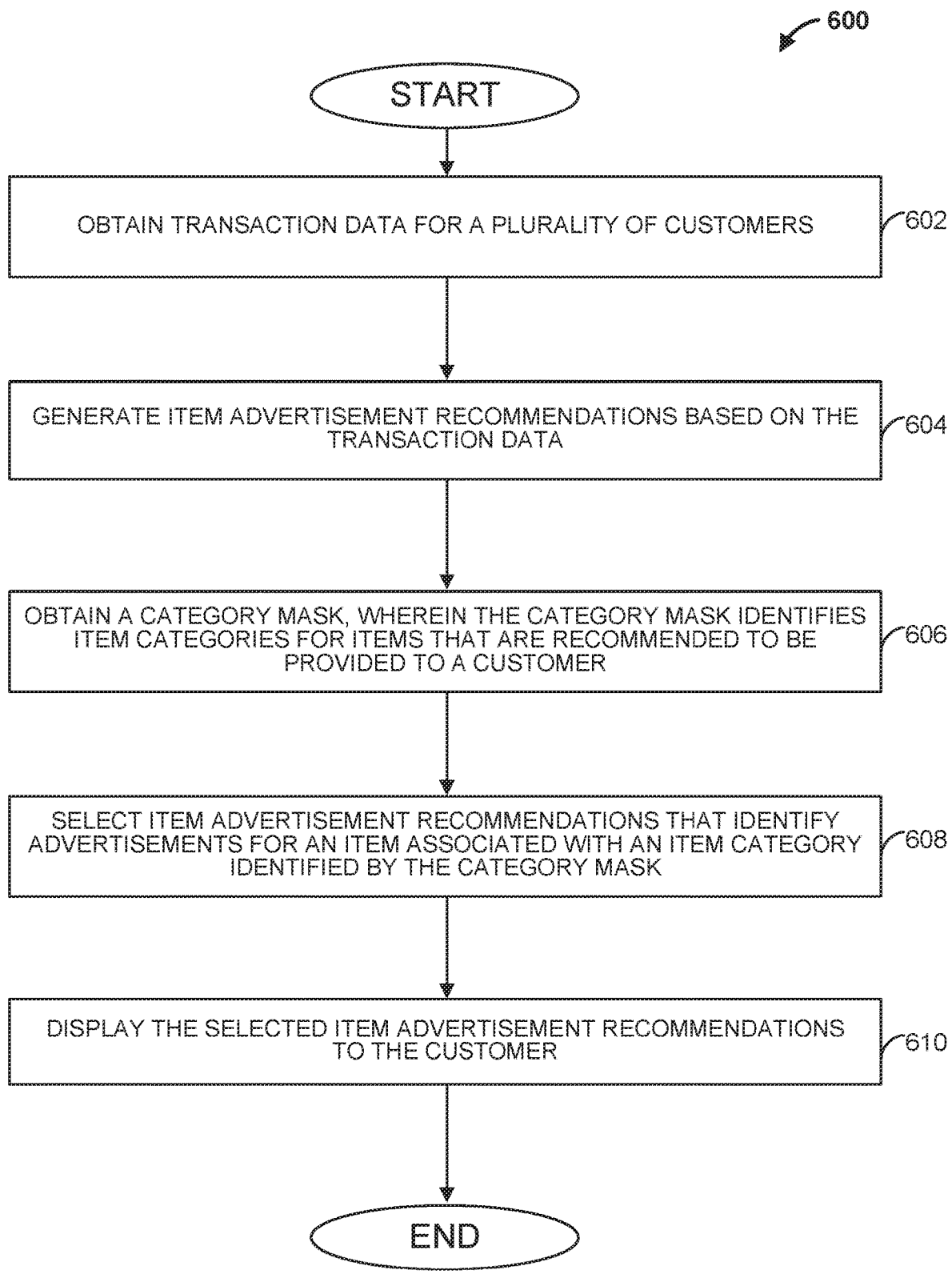
FIG. 6 is a flowchart of another example method that can be carried out by the digital advertisement customization system of FIG. 1 in accordance with some embodiments.

FIG. 6 is a flowchart of an example method 600 that can be carried out by the digital advertisement customization system 400 of FIG. 4. At step 602, a computing device, such as advertisement customization computing device 102, obtains transaction data for a plurality of customers. For example, complementary item-model computing device 401 may obtain user in-store transaction data 330 and user online transaction data 340 from database 116 for the customer. At step 604, item advertisement recommendations are generated based on the transaction data. For example, complementary item-model computing device 401 may generate advertisement recommendations 403 based on transaction data obtained from database 116. The advertisement recommendations 403 may identify one or more item advertisements for the customer.

Proceeding to step 606, a category mask is obtained. The category mask identifies item categories for items that are recommended to be provided (e.g., displayed) to a customer. For example, digital advertisement customization device 102 may generate category mask 415 for the customer, and may transmit the category mask 415 to complementary item-model computing device 401.

At step 608, item advertisement recommendations are selected from those generated at step 604. The selected item advertisement recommendations identify advertisements for an item associated with an item category identified by the category mask obtained in step 606. For example, complementary item-model computing device 401 may determine a category for an item associated with an item advertisement (e.g., by associating the item with an item category identified by item category data 380 in database 116). Complementary item-model computing device 401 may compare the determined category with the obtained category mask to determine if there is a match of categories. If there is a match of categories, the item advertisement recommendation is selected.

Following step 608, the method proceeds to step 610, where the selected item advertisement recommendations are displayed to the customer. The method then ends.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
   a communications interface configured to communicate, over one or more communication networks, with a server configured to host an online platform that is accessible by a computing device of each of a plurality of customers of the online platform, and cause a computing device of one or more of the plurality of customers of the online platform to display one or more of a plurality of item advertisement recommendations;
   a database storing transaction data of each customer of the plurality of customers based on data obtained from the computing device of each of the plurality of customers;
   a memory having instructions stored thereon; and
   one or more processors coupled to the communications interface, the database and the memory, the one or more processors being configured to execute the instructions to:
   obtain, over one or more communication networks and from the server, online session data of the plurality of customers;
   obtain, over one or more networks and from the database, transaction data of each customer of the plurality of customers, the transaction data characterizing a plurality of purchases and a category associated with each of the plurality of purchases;
   for each customer of the plurality of customers, obtain the plurality of item advertisement recommendations based on transaction data of the customer;
   train a machine learning process with a first portion of the online session data and a first portion of the transaction data and implement, by applying the trained machine learning process to at least a second portion of the transaction data, a first set of operations that generate, for each customer of the plurality of customers, mask data, the first set of operations including:
   generating, for each customer of the plurality of customers, first data identifying (i) a plurality of categories associated with the plurality of purchases, and (ii) for each of the plurality of categories, a corresponding frequency of purchases, based on the second portion of the transaction data associated with each customer of the plurality of customers;
   generating, for each customer, a plurality of relevancy scores for pairs of the plurality of categories based on the first data;
   generating, for each customer, the mask data identifying a subset of categories from the plurality of categories based on the generated plurality of relevancy scores;
   for each customer and based on the mask data of each customer, implement a set of item advertisement recommendation operations, the set of item advertisement recommendation operations including:
   for a corresponding plurality of item advertisement recommendations, determining an associated item category;
   for the corresponding plurality of item advertisement recommendations, determining whether the associated item category matches at least one of the categories of the subset of categories by comparing the associated item category to at least the portion of the corresponding mask data;
   selecting each of the obtained plurality of item advertisement recommendations that are determined to have the associated item category that matches at least one of the categories of the subset of categories; and
   in response to a corresponding computing device of the customer accessing the online platform, causing, by communicating with the server over the one or more communication networks, the online platform displayed on a corresponding computing device of the customer to include at least one of the selected item advertisement recommendations based on data indicating the selected one or more item advertisement recommendations.

2. The system of claim 1, wherein the transaction data identifies in-store transactions.

3. The system of claim 1, wherein the relevancy score for the pairs of the plurality of categories is based on a cosine similarity between each of the pairs of the plurality of categories.

4. The system of claim 1, wherein generating, for each customer, the mask data identifying the subset of categories from the plurality of categories comprises determining whether each of the plurality of relevancy scores for the pairs of the plurality of categories is beyond a threshold, wherein the mask data identifies the pairs of the plurality of categories that have relevancy scores beyond the threshold.

5. The system of claim 1, wherein generating the first data comprises generating a category matrix, where each entry of the category matrix identifies a distribution of purchases in a category of the plurality of categories, and wherein the computing device is further configured to apply a non-negative matrix factorization to the category matrix.

6. The system of claim 5, wherein the one or more processors are configured to execute the instructions further to:
   apply a smoothing algorithm to each entry of the category matrix.

7. The system of claim 1, wherein the one or more processors are configured to execute the instructions further to:
    transmit the mask data to a second computing device.

8. The system of claim 1, wherein to the one or more item advertisement recommendation operations includes:
    determining at least one item recommendation advertisement based on the mask data;
    receiving online session data for a first customer; and
    determining a performance value based on the at least one item recommendation advertisement and the online session data.

9. A computer-implemented method comprising:
    obtaining, by a processor of a server, over one or more communication networks, and from a database storing transaction data of each customer of a plurality of customers based on data obtained from a computing device of each of the plurality of customers of an online platform, the transaction data characterizing a plurality of purchases and a category associated with each of the plurality of purchases;
    obtain, by the processor of the server, over one or more communication networks, and from a second server, online session data of the plurality of customers;
    for each customer of the plurality of customers, obtaining a plurality of item advertisement recommendations based on transaction data of the customer;
    training, by the processor of the server, a machine learning process with a first portion of the online session data and a second portion of the transaction data and implementing, by the processor of the server and by applying the trained machine learning process to at least the transaction data, a first set of operations that generate, for each customer of the plurality of customers, mask data, the first set of operations including:
        generating, by the processor of the server and for each customer of the plurality of customers, first data identifying (i) a plurality of categories associated with the plurality of purchases, and (ii) for each of the plurality of categories, a corresponding frequency of purchases, based on the second portion of the transaction data associated with each customer of the plurality of customers;
        generating, by the processor of the server and for each customer, a plurality of relevancy scores for pairs of the plurality of categories based on the first data;
        generating, by the processor of the server and for each customer, the mask data identifying a subset of categories from the plurality of categories based on the plurality of relevancy scores;
    for each customer and based on the mask data of each customer, implementing, by the processor of the server, a set of item advertisement recommendation operations, the one or more item advertisement recommendation operations including:
        for a corresponding plurality of item advertisement recommendations, determining an associated item category;
        for the corresponding plurality of item advertisement recommendations, determining whether the associated item category matches at least one of the categories of the subset of categories by comparing the associated item category to at least the portion of the corresponding mask data;
        selecting each of the obtained plurality of item advertisement recommendations that are determined to have the associated item category that matches at least one of the categories of the subset of categories; and
        in response to a corresponding computing device of the customer accessing the online platform, causing, by communicating with a second server, over the one or more communication networks, that hosts an online platform that is accessible by a computing device of each of the plurality of customers of the online platform, the online platform displayed on a corresponding computing device of the customer to include at least one of the selected item advertisement recommendations based on data indicating the selected one or more item advertisement recommendations.

10. The computer-implemented method of claim 9 wherein the transaction data identifies in-store transactions.

11. The computer-implemented method of claim 9 wherein generating, for each customer, the mask data identifying the subset of categories from the plurality of categories comprises determining whether each of the plurality of relevancy scores for the pairs of the plurality of categories is beyond a threshold, wherein the mask data identifies only the pairs of the plurality of categories that have relevancy scores beyond the threshold.

12. The method of claim 9 wherein generating the first data comprises generating a category matrix, where each entry of the category matrix identifies a distribution of purchases in a category of the plurality of categories, and wherein the method further comprises applying a non-negative matrix factorization to the category matrix.

13. A non-transitory computer readable medium having instructions stored thereon, wherein the instructions, when executed by at least one processor, cause a device to perform operations comprising:
    obtaining, over one or more communication networks and from a database storing transaction data of each customer of a plurality of customers based on data obtained from a computing device of each of the plurality of customers of an online platform, the transaction data characterizing a plurality of purchases and a category associated with each of the plurality of purchases;
    obtaining, over one or more communication networks and from a server, online session data of the plurality of customers;
    for each customer of the plurality of customers, obtaining a plurality of item advertisement recommendations based on transaction data of the customer;
    training a machine learning process with a first portion of the online session data and a first portion of the transaction data and implementing, by applying the trained machine learning process to at least a second portion of the transaction data, a first set of operations that generate, for each customer of the plurality of customers, mask data, the first set of operations including:
        generating, for each customer of the plurality of customers, first data identifying (i) a plurality of categories associated with the plurality of purchases, and (ii) for each of the plurality of categories, a corresponding frequency of purchases, based on the second portion of the transaction data associated with each customer of the plurality of customers;
        generating, for each customer, a plurality of relevancy scores for pairs of the plurality of categories based on the first data;

generating, for each customer, the mask data identifying a subset of categories from the plurality of categories based on the plurality of relevancy scores;

for each customer and based on the mask data of each customer, implementing a set of item advertisement recommendation operations, the set of item advertisement recommendation operations including:

for a corresponding plurality of item advertisement recommendations, determining an associated item category;

for the corresponding plurality of item advertisement recommendations, determining whether the associated item category matches at least one of the categories of the subset of categories by comparing the associated item category to at least the portion of the corresponding mask data;

selecting each of the obtained plurality of item advertisement recommendations that are determined to have the associated item category that matches at least one of the categories of the subset of categories; and in response to a corresponding computing device of the customer accessing the online platform, causing, by communicating, over the one or more communication networks, with a second server that hosts an online platform that is accessible by a computing device of each of the plurality of customers of the online platform, the online platform displayed on a corresponding computing device of the customer to include at least one of the selected item advertisement recommendations based on data indicating the selected one or more item advertisement recommendations.

14. The non-transitory computer readable medium of claim 13, wherein the transaction data identifies in-store transactions.

15. The non-transitory computer readable medium of claim 13, wherein the relevancy score for the pairs of the plurality of categories is based on a cosine similarity between each of the pairs of the plurality of categories.

16. The non-transitory computer readable medium of claim 13, wherein generating, for each customer, the mask data identifying the subset of categories from the plurality of categories comprises determining whether each of the plurality of relevancy scores for the pairs of the plurality of categories is beyond a threshold, wherein the mask data identifies the pairs of the plurality of categories that have relevancy scores beyond the threshold.

17. The non-transitory computer readable medium of claim 13, wherein generating the first data comprises generating a category matrix, where each entry of the category matrix identifies a distribution of purchases in a category of the plurality of categories, and wherein the computing device is further configured to apply a non-negative matrix factorization to the category matrix.

18. The non-transitory computer readable medium of claim 17, wherein the operations comprise:

applying a smoothing algorithm to each entry of the category matrix.

19. The non-transitory computer readable medium of claim 17, wherein the operations comprise:

transmitting the mask data to a second computing device.

* * * * *